(12) United States Patent
Wasiewicz et al.

(10) Patent No.: US 8,947,294 B1
(45) Date of Patent: Feb. 3, 2015

(54) METHOD AND SYSTEM FOR ADAPTIVELY CANCELLING CLUTTER FROM THE SIDELOBES OF A GROUND-BASED RADAR

(75) Inventors: Richard Wasiewicz, Tully, NY (US); Peter H. Stockmann, Jamesville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 562 days.

(21) Appl. No.: 13/287,727

(22) Filed: Nov. 2, 2011

(51) Int. Cl.
*G01S 13/52* (2006.01)
*G01S 7/28* (2006.01)
*H01Q 3/26* (2006.01)
*G01S 7/288* (2006.01)

(52) U.S. Cl.
CPC ............ *G01S 7/2813* (2013.01); *H01Q 3/2611* (2013.01); *G01S 2007/2886* (2013.01)
USPC ............................. 342/162; 342/159; 342/372

(58) Field of Classification Search
CPC .......... G01S 7/2813; G01S 2013/0245; H01Q 3/2611
USPC ............................. 342/81, 159, 162, 163, 194
See application file for complete search history.

(56) References Cited

U.S. PATENT DOCUMENTS

| | | | |
|---|---|---|---|
| 5,311,183 A * | 5/1994 | Mathews et al. | 342/26 B |
| 5,539,412 A * | 7/1996 | Mendelson | 342/192 |
| 5,600,326 A | 2/1997 | Yu et al. | |
| 6,075,484 A * | 6/2000 | Daniel et al. | 342/372 |
| 6,401,036 B1 * | 6/2002 | Geier et al. | 701/495 |
| 2002/0171584 A1 * | 11/2002 | Walker et al. | 342/368 |
| 2003/0020646 A1 * | 1/2003 | Yu | 342/17 |
| 2003/0117314 A1 | 6/2003 | Yu | |
| 2006/0109173 A1 * | 5/2006 | Erikmats et al. | 342/159 |
| 2010/0201572 A1 * | 8/2010 | Lackey et al. | 342/373 |

\* cited by examiner

*Primary Examiner* — John B Sotomayor
*Assistant Examiner* — Marcus Windrich
(74) *Attorney, Agent, or Firm* — Howard IP Law Group, PC (57) ABSTRACT

A system and method of providing to a beamformer a modified complex beam steering vector includes collecting subarray I/Q samples from a plurality of subarrays receiving clutter, performing coherent integration of the subarray I/Q samples to increase the CNR, adaptively modifying a complex beam steering vector to form a null in the direction of the received clutter, and outputting to a beamformer the modified complex beam steering vector. The beamformer receives complex I/Q data samples representing a radar signal containing near-horizon clutter and applies the modified beam steering vector to generate a beamformed signal having an elevated mainlobe and a spatial sidelobe null in the direction of the received clutter.

20 Claims, 5 Drawing Sheets

METHOD AND SYSTEM FOR ADAPTIVELY CANCELLING CLUTTER FROM THE SIDELOBES OF A GROUND-BASED RADAR

FIELD OF THE INVENTION

This invention relates generally to digital beamforming radar systems, and more specifically, to methods and systems for cancelling clutter from the sidelobes of a ground-based radar.

BACKGROUND OF THE INVENTION

Ground-based radars receive clutter from many sources. Typical sources of clutter include terrain clutter, vehicle clutter, and volume clutter, by way of example only. Conventional cancellation techniques for cancelling clutter include Doppler processing and non-adaptive or deterministic spatial nulling. Such cancellation techniques, however, introduce into the system undesirable traits and characteristics that limit their utility.

For example, Doppler processing is typically applied to all beam positions that contain clutter, including lower beam positions contaminated by surface and near-surface clutter through their mainlobes and sidelobes, as well as upper beam positions contaminated by surface and near-surface clutter through their sidelobes alone. However, Doppler domain processing introduces potentially significant signal loss, particularly when a broad Doppler null is required to suppress velocity-spread volumetric clutter (e.g. clutter due to birds, chaff, and atmospheric disturbances, known as "angels"). Further, Doppler nulling undesirably generates velocity spans within which the probability of target detection is greatly reduced (otherwise known as blind or dim velocities). In particular, conventional Doppler clutter cancellation in upper beams contaminated by sidelobe clutter introduces velocity blind and dim speeds.

Applying conventional non-adaptive or deterministic spatial nulling to one or more of the transmit or receive waveforms produces a null in the two-way beam's sidelobes over the solid angle occupied by clutter. Being non-adaptive, this process computes element or subarray perturbations based on the simulated or measured amplitude and phase responses of the subarray or element channels, including the angle dependent subarray or element gain patterns that are unique to each channel. As simulated or measured channel responses differ from the actual channel responses by unknown amplitude and phase errors, the nulling weights computed therefrom are erroneous, resulting in nulls of unduly limited depth. Residual unknown amplitude and phase errors remain, even after antenna calibration. Further, a non-adaptive approach positions and shapes the nulls without regard for the actual angle distribution of the clutter. This results in a mismatch between the two-way null shape obtained and the clutter's true angle distribution. Such mismatches result even when the transmit and receive element or subarray channels are substantially error free.

Alternative systems and methods for cancelling ground-based radar sidelobe clutter are desired.

SUMMARY OF THE INVENTION

The present invention involves a digital beamforming system and method for adaptively cancelling sidelobe clutter in the spatial domain from any elevated beam position that does not also contain mainlobe clutter. During normal radar operation, element or subarray signal samples are collected. The collected samples contain backscattered clutter returns from a block of range cells spanning a given range extent of interest. The clutter samples are coherently integrated through a pulse compressor and a low frequency (e.g. zero-hertz-centered) Doppler filter that sums the pulse compressor samples for each range pulse-to-pulse to enhance clutter-to-noise ratio. These processed samples are then used to compute a set of amplitude and phase perturbations to the beam's normal beam steering weights to provide a set of modified steering weights. The modified steering weights are used by the digital beamformer to form a beam having reduced sidelobe gain over the solid angle occupied by the clutter. The lowered receive gain over this solid angle reduces the net integrated sidelobe clutter-to-noise ratio typically from a level tens of decibels above thermal noise, to a level well below the thermal noise floor.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while omitting, for purposes of clarity, other elements found in typical radar systems and methods. Because such elements are well known in the art, and because they do not facilitate a better understanding of the present invention, a discussion of such elements is not provided herein.

The present disclosure teaches a method of providing to a beamformer a modified complex beam steering vector that includes the steps of collecting subarray I/Q (inphase/quadrature phase) samples from a plurality of subarrays receiving clutter, performing coherent integration of the subarray I/Q samples to increase the clutter-to-noise ratio, adaptively modifying a complex beam steering vector to form a null in the direction of the received clutter, and outputting to a beamformer the modified complex beam steering vector.

In one aspect of the disclosure, a method for reducing sidelobe clutter or electromagnetic interference (EMI) in a radar system comprises receiving complex subarray I/Q data samples from a plurality of subarrays of a ground based digital beamforming radar antenna, wherein the subarray I/Q samples represent a radar signal containing near-horizon backscattered clutter or EMI. The received I/Q data samples are coherently integrated to increase the clutter-to-noise or EMI to-noise ratio of the I/Q data samples. Range cells are selected containing the increased clutter-to-noise or EMI to-noise ratio samples over a target range extent associated with the range of the received clutter or EMI to be cancelled. Nominal beam steering weights are adaptively modified using the selected range cells to generate a modified beam steering vector. Complex subarray I/Q samples are processed in a digital beamformer using the modified beam steering vector to form a spatial sidelobe null in the direction of the received clutter or EMI. The step of coherently integrating the received I/Q data samples to increase the clutter-to-noise ratio (CNR) or EMI-to-noise ratio (ENR) of the I/Q data samples may comprise compressing the I/Q samples and Doppler filtering the I/Q samples. In a further aspect, the Doppler filtering applies zero hertz Doppler filtering of the I/Q data samples.

In another aspect, the step of adaptively modifying beam steering weights using the selected range cells to generate the modified beam steering vector includes applying amplitude and phase perturbations to the beam steering vector to suppress the gain in one or more sidelobes near the received clutter. Different modified complex beam steering vectors may be determined and applied for different array azimuth positions and/or target range spans.

In still another aspect of the disclosure there is provided a system for adaptively reducing clutter or EMI from the sidelobes of a ground-based radar. The system includes a plurality of radar subarrays configured to receive radar signals containing near-horizon clutter or EMI. A digital receiver is adapted to convert the radar signals received by the radar subarrays to complex subarray I/Q samples, the subarray I/Q samples containing near-horizon backscattered clutter or EMI. A coherent integration processor coherently integrates the complex subarray I/Q samples to increase the clutter or EMI to-noise ratio of the complex subarray I/Q samples. A range gate receives as an input the output of the coherent integration processor and outputs integrated I/Q data samples with increased clutter-to-noise or EMI-to-noise ratio from select range cells over a target range extent associated, with the range of the received clutter or EMI to be cancelled. An adaptive clutter processor receives the gated integrated data samples from the range gate and modifies a complex beamforming vector according to the integrated data samples to generate a modified complex beam steering vector. A digital beamformer is coupled to the digital receiver and configured to receive complex subarray I/Q data samples and apply the modified complex beamforming vector to the received complex subarray I/Q data samples so as to output a set of complex beam I/Q samples of a radar beam having a spatial sidelobe null in the direction of the received clutter or EMI.

In one aspect, the adaptive clutter processor may be a non-real time processor. In another aspect, the coherent integration processor may be configured to apply pulse compression and zero hertz Doppler filtering to the subarray I/Q samples. In still another aspect, the adaptive clutter processor modifies the complex beamforming vector by providing amplitude and phase perturbations to the complex beamforming vector. The adaptive clutter processor may be configured to determine and apply different modified complex beam steering vectors for different array azimuth positions and different range spans to account for azimuth variable and range variable clutter angle distributions.

The system may further include a data buffer configured to load the complex subarray I/Q samples received from the digital receiver to the coherent integration processor.

Figure 1:
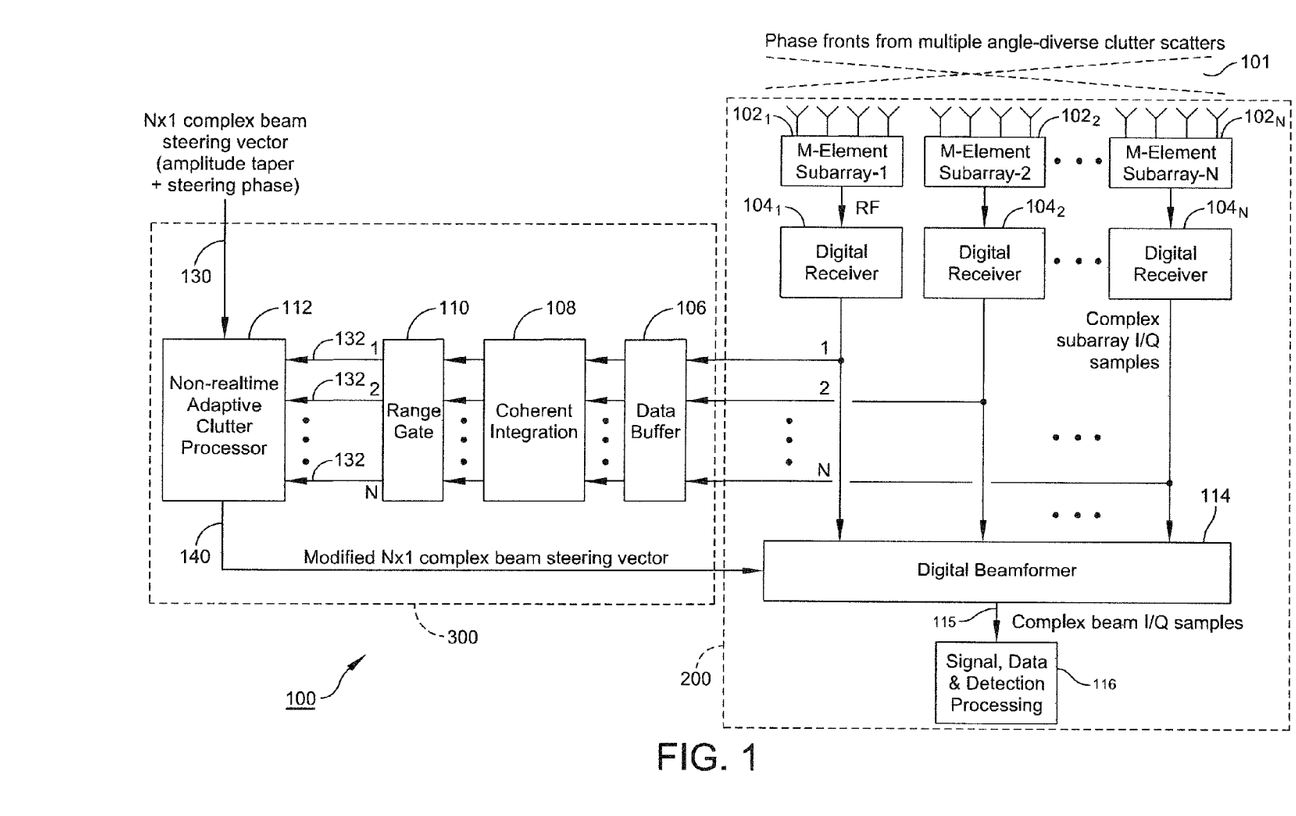
FIG. 1 shows a block diagram of an exemplary ground based digital beamforming radar system configured to adaptively cancel near-horizon clutter from the sidelobes of an elevated beam according to an exemplary embodiment of the present invention.

Referring now to FIG. 1, there is illustrated a block diagram of an exemplary ground based digital beamforming radar system 100 configured to adaptively cancel near-horizon clutter from the sidelobes of an elevated beam. Radar system 100 includes a plurality of M-element antenna subarrays $102_1, 102_2, \ldots, 102_N$ (referred to individually as $102_i$ and collectively as 102). These subarrays may be arranged, in an exemplary configuration, as a vertical stack, and preferably, in both vertical and horizontal dimensions. Subarrays 102 may be groups of radar antenna elements whose outputs are combined and applied to a corresponding subarray receiver that outputs a digital subarray signal. A digital beamformer combines each of the digital subarray signals to generate a digital receive beam. It is understood that each subarray may comprise multiple receive elements, or may be defined by a single element, according to the requirements of the particular application. Such subarrays are well known in the art.

In one exemplary configuration, each subarray of antenna elements may be configured to transmit radar pulse signals through an illumination space and to receive echo or reflection signals as well as any incident interference and noise signals. The antenna beam width, antenna azimuth, scanning rate, and other antenna design features are determined in accordance with the radar system design considerations. The subarrays receive radar signals containing both target data as well as clutter in the form of waveform phase fronts 101 from multiple angle-diverse clutter scatterers, and output RF (radio frequency) signals to a plurality of digital receivers $104_1$, $104_2, \ldots, 104_N$ (referred to individually as $104_i$ and collectively as 104). Digital receivers 104 may be conventional digital receivers configured to receive RF signals from the radar subarrays and to output complex subarray I/Q samples. For example, each digital receiver may include an analog to digital converter (ADC) and associated front-end/back-end circuitry, such as front-end amplifier and/or bandpass filter upstream of the ADC, and a demultiplexer and/or FPGA (field programmable gate array) downstream of the ADC. In any event, the output of the digital receivers 104 provides digital subarray I/Q (complex) samples to a typical digital beamformer 114. The digital beamformer 114 is configured to integrate the subarray signal samples output from each of the digital receivers. In one embodiment, the digital beamformer linearly combines the digitally downconverted I/Q signal samples output from each of the digital receivers 104 with a complex weighted beam steering vector to provide complex baseband output I/Q samples 115. As shown in FIG. 1, the digital beamformer 114 receives as input a beam steering vector 140 that is applied to the complex digital I/Q samples and applies the steering vector to the signals so as to provide at an output complex beam I/Q sample data 115 for processing by downstream signal data detection processing module 116.

In accordance with an aspect of the present invention, the output samples from each of the digital receivers 104 are also applied (e.g. via corresponding taps 1-N) to adaptive complex beam steering weight processor 300 for generating beam steering vector 140. Processor 300 includes data buffer 106 configured to receive each of the complex subarray I/Q samples output from each digital receiver $104_i$. Data buffer 106 is configured to capture the data stream I/Q samples from each of the subarrays as the radar rotates. If each subarray consists of a single element, then the captured data can be used to compute nulls for multiple beam elevation angles. In the event that each subarray comprises multiple elements steered in elevation at the subarray level, then the captured data is applied at that particular beam elevation angle to generate nulls for a beam steered to that elevation angle. In this case, a corresponding set of data is collected for each steering angle. Data buffer 106, by way of example only, may be a memory or register configured to receive and load sets of N complex subarray I/Q samples to a coherent integrator 108.

It is to be understood that processor 300 may be implemented as a stand alone processor, or may be implemented as part of signal data and detection processor 116.

Coherent integrator 108 receives the buffered output samples and performs pulse compression (e.g. sample to sample integration) and Doppler filtering (e.g. pulse to pulse integration) of the I/Q sample data to increase the CNR associated with the signal samples. The Doppler filtering is preferably applied at a frequency centered at zero hertz (i.e. 0 Hz) in order to provide a strong clutter signal. Coherent integrator 108 may be embodied as hardware, firmware, software and/or combinations thereof. For example, the zero hertz coherent integrator may be embodied as an adder. Pulse compression may be implemented in the time domain as a filtering function, or in the frequency domain as a discrete Fourier Transform (DFT) (e.g. implemented as a fast Fourier Transform or FFT). The coherent integrator takes account of the phase information for the buffered sample data having real and imaginary components, or equivalently, magnitude and phase components, and coherently integrates these components over a given duration. Unlike typical radar Doppler filtering employed by radar systems to cancel clutter, however, coherent integration processor 108 includes Doppler processing centered at zero Hz frequency to integrate up (i.e. increase) energy that is near zero Doppler. The order of processing (e.g. Doppler filtering, pulse compression) may be dependent on the particular application. The output of coherent integration processor 108 comprises data representative of enhanced CNR range cells for N subarray channels for application to range gate 110.

Range gate 110 may be a typical radar range gate configured to select those range cells from the range span of interest (i.e. those range cells containing the clutter to be cancelled). By way of example, a ground-based radar may capture range cells near the horizon a certain distance from the radar based on the height of the radar above the surface (e.g. 100 or 200 range cells of integrated data). The clutter in these range cells is representative of the clutter reflecting back from the horizon. In contrast, the main lobe of the radar beam is oriented at an upper beam position off of the ground (e.g. well above the horizon). Range gate 110 outputs N range cells to adaptive clutter processor 112 for training adaptive weights.

Adaptive clutter processor 112 receives the subset range cell data output from range gate 110 and determines a new set of beam steering weights intended to leave the radar beam essentially unaltered, except for reducing the gain in the direction of the clutter which is near the horizon. Adaptive clutter processor 112 may comprise a non-real time architecture. Processor 112 may comprise hardware, firmware, software and/or any combination thereof. Adaptive clutter processor 112 may be embodied as a processing unit (e.g., comprising a microprocessor, memory, and clock functions) configured to receive N sets of range cells 132 and N complex beam steering weights 130 and output N modified complex beam steering weights 140. The processor may be adapted to determine a matrix (e.g. an inverse covariance matrix) based on the received N sets of range cells 132, and apply the matrix (e.g. multiply) to the N complex beam steering weights 130 in order to generate the N modified complex beam steering weights 140. Such functionality may be implemented according to various systems and computational methods, the description of which is omitted herein for brevity. The N complex beam steering weights 130 may be considered as an N×1 complex beam steering vector (with amplitude taper and steering phase) as typical complex beam steering weights are conventionally understood. These nominal or conventional beam steering weights or coefficients 130 are the weights applied to each of the subarrays that would otherwise be used to integrate the subarray data at the beamformer. These weights are selected to steer the radar beam electronically so that the mainlobe does not intersect near-horizon clutter (e.g. within about 3 degrees).

Adaptive clutter processor 112 thus adaptively modifies the N complex beam steering weights 130 to form a null in the direction of the clutter.

By way of example, radar data samples $d_{ij}$ (where i represents the range cell index and j represents the azimuth position) from each of the N subarrays may be collected and an N×MK matrix D of I/Q data samples may be formed from range cells of a given azimuth such that:

$$D = [\bar{d}_{11}, \bar{d}_{12}\bar{d}_{13}, \ldots, \bar{d}_{1M} | \bar{d}_{21}, \bar{d}_{22}, \bar{d}_{23}, \ldots, \bar{d}_{2M} | \bar{d}_{31}, \bar{d}_{32}, \ldots, \bar{d}_{3M} | \bar{d}_{K1}, \ldots, \bar{d}_{KM}]$$

For a total of MK columns and where K represents the last azimuth and where the "overscore" such as $\bar{d}$ is used to indicate a column vector.

Thus, subgroup $\bar{d}_{11}, \bar{d}_{12}, \bar{d}_{13}, \ldots, \bar{d}_{1M}$ represents the range cells 1-M for azimuth 1; subgroup $\bar{d}_{21}, \bar{d}_{22}, \bar{d}_{23}, \ldots, \bar{d}_{2M}$ represents the range cells 1-M for azimuth 2; subgroup $\bar{d}_{31}, \bar{d}_{32}, \ldots, \bar{d}_{3M}$ represents the range cells 1-M for azimuth 3; and so on. Each subgroup represents an N×1 vector from a given 0 Hz Doppler filter as described herein.

Each d vector is an N×1 data snapshot or representation and since there are MK such vectors, a sample covariance matrix R may be determined according to:

$$R = \frac{1}{MK} DD^H$$

A modified null vector $\bar{w}_{null}$ may then be determined according to:

$$\bar{w}_{null} = [R + \alpha I]^{-1} \bar{w}_0$$

where $\bar{w}_0$ is a normal N×1 weight vector and α is a coefficient (e.g. constant) that controls target null depth. I is an identity matrix with dimensions equal to the dimensions of R. M is the number of range cells used to train the adaptive weights. Based on the results of the performance of an algorithm to adaptively modify the N complex beam steering weights 130, adaptive clutter processor 112 makes small amplitude and phase perturbations to the N complex beam steering weights 130 to suppress the gain in the sidelobes in the direction of clutter, while leaving the main beam unmodified. Adaptive clutter processor 112 outputs N modified complex beam steering weights 140 to downstream digital beamformer 114. Digital beamformer 114 applies the modified weights to the complex I/Q samples received from each of the digital receivers 104 to form a beam having low sidelobe gain over the solid angle occupied by clutter. That is, the output beam pattern 115 includes a null through the sidelobes in the direction of the clutter, such as a horizon-following null. The complex I/Q samples output by the beamformer are provided to downstream radar components 116 for processing and post processing (e.g. signal, data, and detection processing).

Embodiments of radar system 100 shown in FIG. 1 may include adaptive complex beam steering weight modifier module 300 operative as a stand alone processor operatively coupled to a digital beamforming radar 200 (e.g. a digital beamforming phased array radar), or may be integrated within an overall digital signal processor of the radar 200.

The system may include control features such as a beam scheduler and processor operable to control appropriate element-level phase shifters by a given amount along with timing control for periodic refreshing of the weights, re-computing the weighting coefficients, and then updating the weight values in memory for subsequent application to the received and processed radar data.

Figure 2:
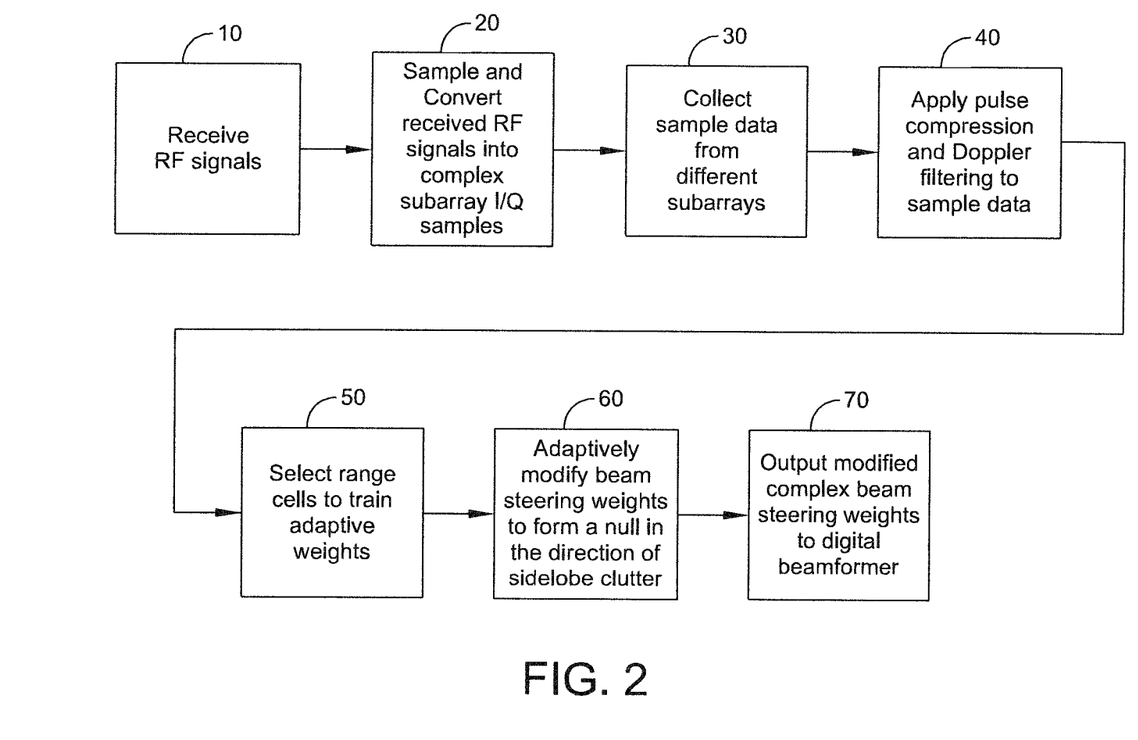
FIG. 2 shows a process flow for adaptively cancelling near-horizon clutter from the sidelobes of a ground based digital beamforming radar according to an exemplary embodiment of the present invention.

FIG. 2 shows a process flow useful for adaptively cancelling clutter from the sidelobes of a ground-based radar. As shown in the process flow of FIG. 2 and with reference to the system described in FIG. 1, at block 10, a plurality of antenna subarrays are configured to receive RF signals. The received RF signals include phase fronts from multiple angle diverse clutter sources. At block 20, digital receivers receive the RF signals from each of the subarrays, sample the data, and output complex subarray (I/Q) samples.

At block 30, sample data output from each digital receiver is collected and buffered. At block 40, the collected I/Q sample data is coherently integrated (e.g. via pulse compression and zero-hertz-centered Doppler filtering) to increase the CNR of the I/Q sample data. At block 50, a number of range cells are selected based on a range extent of interest (associated with the range span within which target detections are expected) to compute adaptive beam steering weights. By way of example, the processing associated with block 50 may be performed by a range gate.

At block 60, beam steering weights are adaptively modified to reduce beam sidelobe gain in all directions with sidelobe clutter, as described herein, without affecting the radar's main beam. At block 70, the complex beam steering weights are output to the radar's digital beamformer. The digital beamformer forms a beam pattern including a null having an extent in azimuth and elevation through the sidelobes experiencing clutter. Thus, the process flow of FIG. 2 adaptively cancels sidelobe clutter in the spatial domain by forming nulls in the direction of clutter, independent of azimuth, thereby reducing sidelobe gain in the direction of the clutter.

The adaptive technique described herein provides advantages over conventional deterministic spatial nulling. For example, null depths are not limited by unknown channel errors because the effects of these errors are included in the received clutter signals that are used to compute the nulling weights. As a result, adaptive null depths may be significantly deeper than non-adaptive null depths, even in the presence of large unknown subarray channel errors. This enables significantly better sidelobe clutter cancellation. This minimal sensitivity to channel errors additionally reduces the need for accurate channel calibration. Additionally, because the nulling weights are derived from actual clutter returns, the position and shape of the resulting null better matches the actual angle distribution of the clutter than the null produced by a non-adaptive process, thereby resulting in more effective clutter cancellation.

The adaptivity of the process flow of FIG. 2 further provides advantages over Doppler nulling because it does not produce the blind or dim speeds that are characteristic of Doppler nulling. By eliminating upper beam blind and dim speeds according to aspects of the present invention, the upper beams are positively affected, particularly since the upper beams contain the most distant, fastest, and difficult to detect targets. The blind or dim speeds produced by Doppler nulling reduce the probability of detecting targets at certain target radial velocities. The adaptivity of the process flow of FIG. 2 advantageously avoids this drawback.

The process flow of FIG. 2 may be modified to further match nulling weights to actual clutter returns in various clutter environments. By way of example only, different beam steering weights may be computed, stored in memory (e.g. within processor 112 of FIG. 1) and applied for different array azimuth positions and/or for different range spans to account for azimuth-variable and/or range-variable clutter angle distributions. This may be accomplished for example, by selectively collecting weight training data over only a given sector of the full rotation of the radar, in order to optimize the nulling as a function of azimuth as well as elevation.

Another benefit according to an aspect of the disclosure includes reducing the burden on other radar subsystems. By way of example, EMI frequently originates from the same elevation angles as the ground clutter. The adaptive spatial nulling technique and system provided by embodiments of the invention disclosed herein also attenuates in-band interference from sources on or close to the earth's surface, the most common location for these EMI sources. Thus, the invention reduces the burden on radar subsystems that operate to mitigate EMI.

Figure 3A:
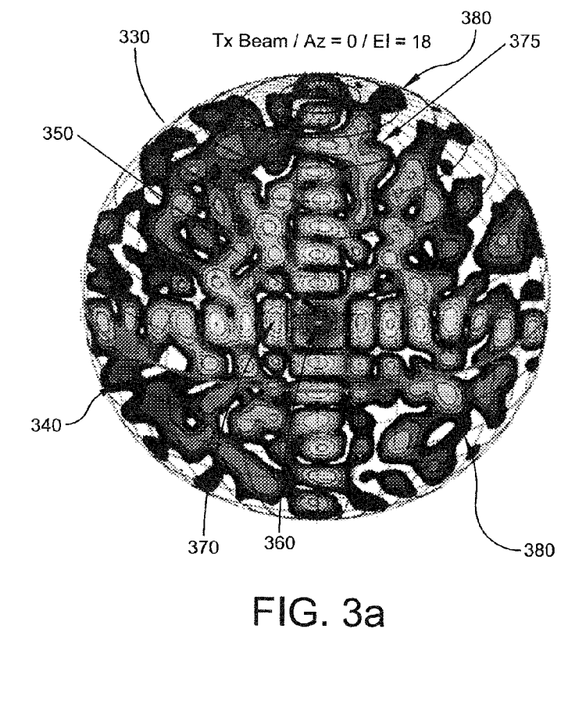
FIGS. 3a and 3b, 4a and 4b, and 5a and 5b depict adaptive clutter nulling performance simulation results for select digital beamforming radar and clutter parameters in accordance with aspects of the present invention.
Figure 3B:
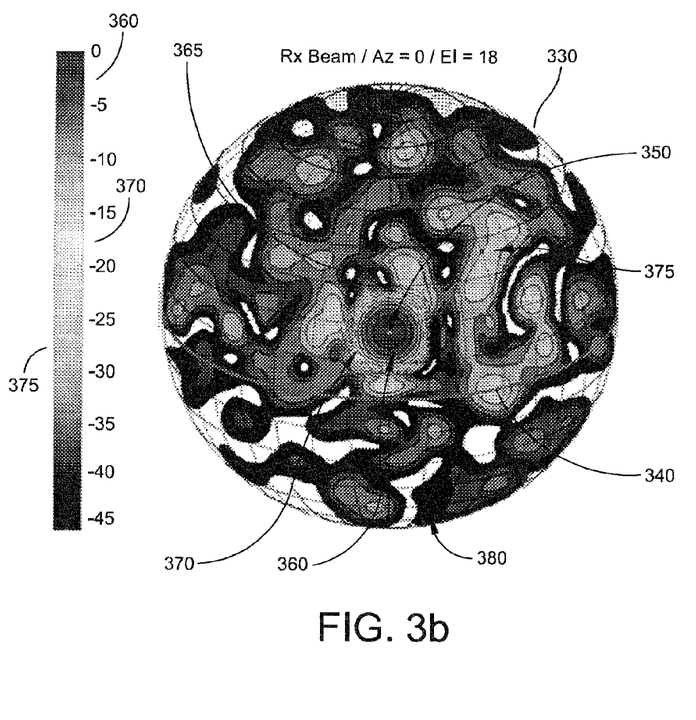
Figure 4A:
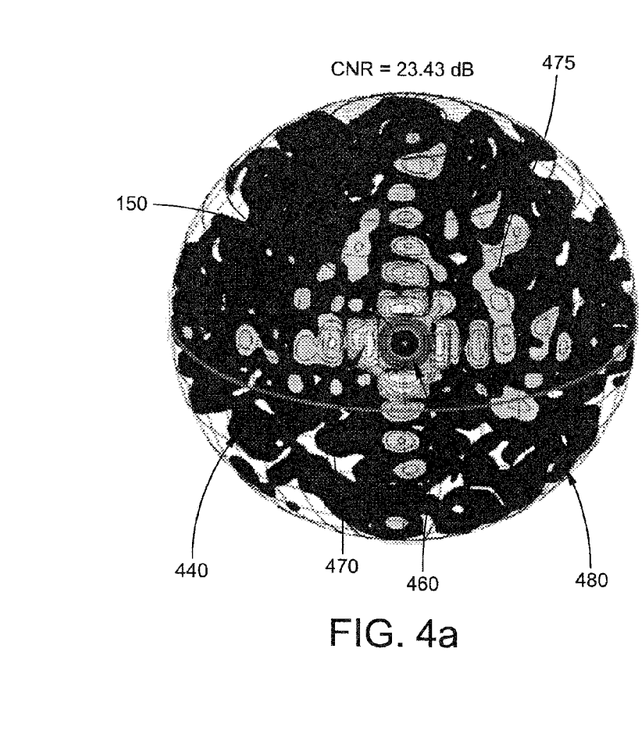
Figure 4B:
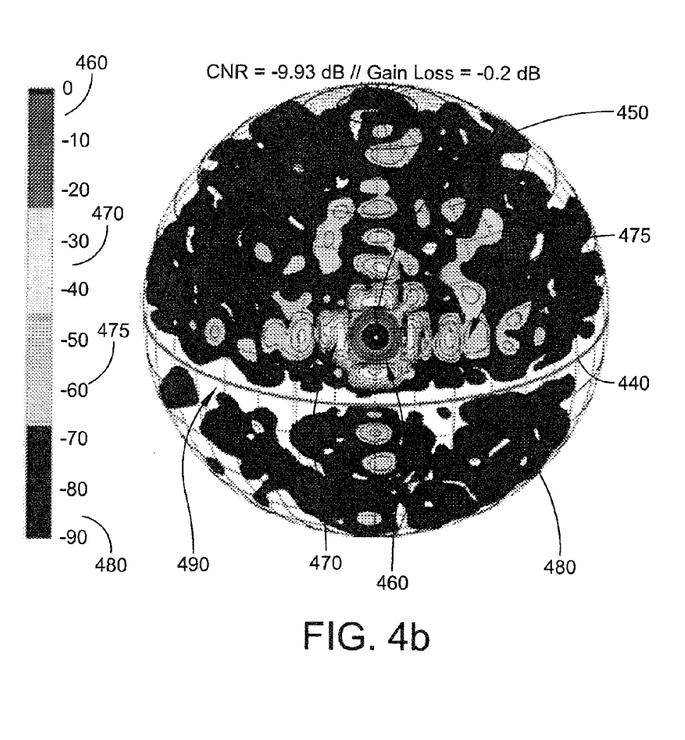
Figure 5A:
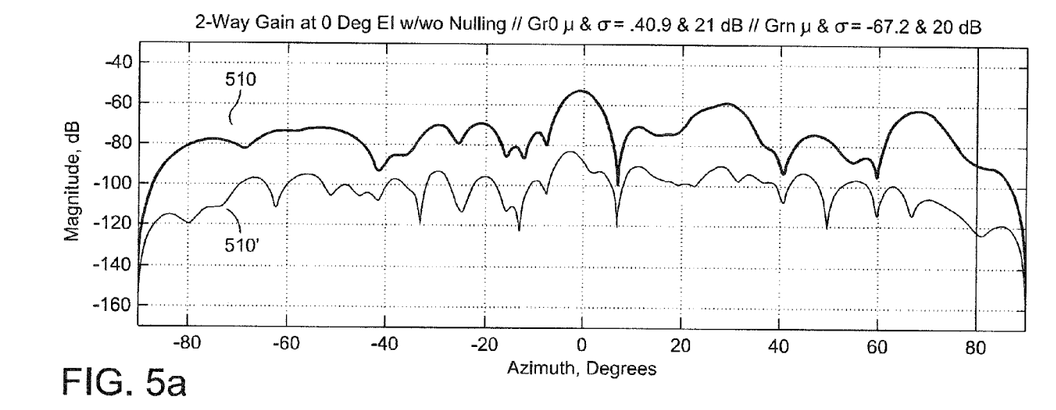
Figure 5B:
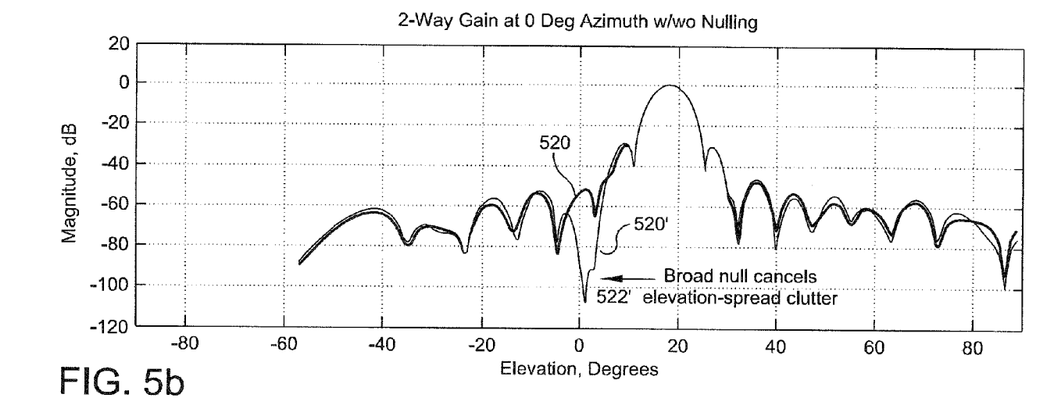

FIGS. 3-5 depict adaptive clutter nulling performance simulation results for select radar and clutter parameters in accordance with aspects of the present invention. As described below, a radar system simulation was performed with the following parameters: frequency=1000 MHz; wavelength ($\lambda$)=0.3 meters (m); 16×16 element-based digital beamforming array (256 elements total); horizontal spacing between elements=0.15 m ($\lambda/2$); vertical spacing between elements=0.15 m ($\lambda/2$); even indexed columns shifted vertically by 0.075 m ($\lambda/4$) relative to odd indexed columns to form a triangular element grid; and 24 degree (24°) radar structure tiltback. The angles from which near-horizon clutter originates map into a curve in sine-space. If the tiltback angle is zero, this curve degenerates into a horizontal line through sine space. The height of the array phase center above the surface was sufficiently low such that the radar horizon is accurately approximated by zero degrees elevation.

Additional parametric data include uniform aperture weighting on transmit; aperture weighting on receive of 35 dB nbar-6 Taylor on rows and columns; element pattern of $\cos^{3/2}$ and 1-way power. While no element-to-element mutual coupling is provided for in the current example, it is believed that simulations that include mutual coupling show that the resulting element-unique, angle-dependent amplitude and phase variations have negligible impact on adaptive clutter nulling.

The standard deviation of angle and frequency-independent phase error on each element channel on transmit is set to 12 degrees (representative of an exceptionally large error level selected for this example to illustrate the adaptive clutter nulling technique's immunity to channel errors). The standard deviation of amplitude error on each element channel on transmit is set to 1.65 dB (1.65 dB is equivalent to 12 degrees with respect to its effect on the beam pattern).

Clutter is modeled in one range cell as 100 Swerling I point scatterers uniformly distributed in azimuth between −90 degrees and +90 degrees and uniformly distributed between 0 degrees and 2 degrees in elevation. Simulations show that results are insensitive to the assumed number of clutter scatterers. Four hundred (400) independent range cells are used to train adaptive weights. Cancellation performance is estimated by applying the resulting nulled beam to an independent set of 400 range cells.

Clutter scatterer radar cross-sections (RCS) are scaled such that net per-sample CNR is 70 dB at the output of a horizon beam steered to 3° elevation, and after pulse compression and Doppler integration, the beam is then steered to 18° elevation for the subject performance example. Elevation of 18 degrees is chosen, for example, because it directs the peak of a transmit sidelobe at the horizon, thus representing a worst-case scenario.

FIGS. 3a-3b depict gain contour examples for simulated transmit (Tx) and receive (Rx) beams, respectively, before adaptive clutter nulling, with peaks normalized to 0 dB for plotting. As shown therein, the outer circle depicted by reference numeral 330 represents the boundary of visible space (i.e. the array's forward hemisphere) in sine-space. The curved grid lines represent the loci of constant azimuth (az) and elevation (el) (with 10 degree grid lines with dots 1 degree apart) mapped into sine-space. The curve labeled 340 represents a zero degree elevation mapped into sine-space. Reference numerals 350 represent the transmit (Tx) and receive (Rx) beam axes at 0 degrees az and 18 degrees el. (center of the beam axis). Constant gain contours are 3 dB apart. The pattern shown in FIG. 3a represents a substantially zero dB region 360 central to both FIGS. 3a and 3b. The contour gain as shown in FIG. 3a proceeds in a cross like pattern from region 360 to a gain region progressing to 370. Gain region 375 represents a further diminished gain region, while 380 depicts a minimum gain region. The gain contour of FIG. 3b reflects the gain regions from 360 through 370 positioned about the approximately rectangular central area depicted as 365.

FIGS. 4a-4b depict an adaptive clutter nulling performance example of two way beam patterns before (FIG. 4a) and after (FIG. 4b) adaptive clutter nulling. As shown therein, the circles represented by reference numeral 450 are the −6 dB 2-way contour before nulling. The constant gain contours are 6 dB apart. The total sidelobe CNR in 18 degree beam before nulling is 23.4 dB, as shown in FIG. 4a. As shown in FIG. 4b, the total sidelobe CNR in 18 degree beam after nulling is −9.9 dB. The net sidelobe clutter is reduced 33.3 dB by adaptive spatial nulling with a gain reduction on mainbeam axis due to nulling equal to 0.2 dB. As shown by reference numeral 490, the sine spaced curved horizon-following clutter null in the 2-way beam pattern attenuates clutter over +/−90 degrees az & 0-2 degrees el by 33 dB. In similar fashion to FIGS. 3a-3b, reference numerals 460, 470, 475 and 480 depict contour gain regions ranging from 0 through −90.

FIGS. 5a-5b illustrate 2 way gain cuts at select elevation/azimuth both before and after nulling. More particularly, FIG. 5a shows a two way gain vs azimuth at 0 degrees elevation. FIG. 5b shows a two way gain vs elevation at 0 degrees azimuth. Curves 510, 520 depict cuts through 2-way beam before nulling. Curves 510', 520' depict cuts through 2-way beam after nulling. Before nulling, the mean receive gain at 0 degrees elevation is −40.9 dB below 0 dB beam peak. After nulling, the mean receive gain at 0 degrees elevation is −67.2 dB below 0 dB beam peak. Nulling reduces mean receive gain at 0 degrees elevation by 26.3 dB. Reduction in receive gain along 0 degrees elevation also reduces incoming EMI. As shown by reference numeral 522' the broad null cancels the elevation-spread clutter.

While complex beam steering weights and modified complex beam steering weights are referred to throughout this specification, it is understood that a plurality of beam steering weights forms a beam steering vector, as shown for example in FIG. 2.

While the foregoing embodiments of the invention have been described with reference to the drawings, it is understood that various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for reducing sidelobe clutter or electromagnetic interference (EMI) in a radar system comprising:
   receiving complex subarray I/Q data samples from a plurality of subarrays of a ground based digital beamforming radar antenna, the subarray I/Q samples representing a radar signal containing near-horizon clutter or EMI;
   coherently integrating in at least one processor, the received I/Q data samples to increase the CNR or ENR of the I/Q data samples;
   selecting in the at least one processor, range cells containing the increased CNR or ENR samples over a target range extent associated with the range of the received clutter or EMI to be cancelled;
   adaptively modifying in the at least one processor, beam steering weights using said selected range cells to generate a modified beam steering vector;
   processing in a digital beamformer, complex subarray I/Q samples using the modified beam steering vector to form a spatial sidelobe null in the direction of the received clutter or EMI.

2. The method of claim 1, wherein the step of coherently integrating the received I/Q data samples to increase the CNR or ENR of the I/Q data samples comprises compressing the I/Q samples and Doppler filtering the I/Q samples.

3. The method of claim 2, wherein the Doppler filtering comprises zero Hertz Doppler filtering.

4. The method of claim 1, wherein the step of adaptively modifying beam steering weights using said selected range cells to generate a modified beam steering vector includes applying amplitude and phase perturbations to the beam steering vector to suppress the gain in one or more sidelobes near the received clutter.

5. The method of claim 1, wherein the step of processing in the digital beamformer complex subarray I/Q samples using the modified beam steering vector to form a spatial sidelobe null in the direction of the received clutter or EMI further comprises beamforming the received complex subarray I/Q samples using the modified beam steering vector to thereby adaptively cancel sidelobe clutter in the spatial domain from elevated beam positions that do not contain mainlobe clutter.

6. The method of claim 1, wherein the step of processing in the digital beamformer complex subarray I/Q samples using the modified beam steering vector to form a spatial sidelobe null in the direction of the received clutter or EMI further comprises determining and applying different modified complex beam steering vectors for different array azimuth positions.

7. The method of claim 1, wherein the step of processing in the digital beamformer complex subarray I/Q samples using the modified beam steering vector to form a spatial sidelobe null in the direction of the received clutter or EMI further comprises determining and applying different modified complex beam steering vectors for different array azimuth positions and different range spans.

8. The method of claim 1, wherein the subarray I/Q samples represent a radar signal containing near-horizon clutter, and wherein the clutter in the selected range cells is representative of the clutter originating from angles near the horizon.

9. A system for adaptively reducing clutter or EMI from the sidelobes of a ground-based radar comprising:
 a plurality of radar subarrays configured to receive radar signals containing near-horizon clutter or EMI;
 a digital receiver adapted to convert the radar signals received by the radar subarrays to complex subarray I/Q samples, the subarray I/Q samples containing near-horizon clutter or EMI;
 a coherent integration processor that coherently integrates the complex subarray I/Q samples to increase the CNR or ENR of the complex subarray I/Q samples;
 a range gate responsive to the coherent integration processor for providing the integrated I/Q data samples with increased CNR or ENR from range cells over a target range extent associated with the range of the received clutter or EMI to be cancelled;
 an adaptive clutter processor that receives the gated integrated data samples from the range gate and modifies a complex beamforming vector according to said integrated data samples to generate a modified complex beam steering vector; and
 a digital beamformer coupled to the digital receiver for receiving complex subarray I/Q data samples and configured to apply the modified complex beamforming vector to said received complex subarray I/Q data samples and output a set of complex beam I/Q samples of a radar beam having a spatial sidelobe null in the direction of the received clutter or EMI.

10. The system of claim 9, wherein the adaptive clutter processor is a non-real time processor.

11. The system of claim 9, wherein the coherent integration processor is configured to apply pulse compression and zero hertz Doppler filtering to the subarray I/Q samples.

12. The system of claim 9, wherein the adaptive clutter processor modifies the complex beamforming vector by providing amplitude and phase perturbations to the complex beamforming vector.

13. The system of claim 9, wherein the adaptive clutter processor determines and applies different modified complex beam steering vectors for different array azimuth positions and different range spans to account for azimuth variable and range variable clutter angle distributions.

14. The system of 9, further comprising a data buffer configured to load the complex subarray I/Q samples received from the digital receiver to the coherent integration processor.

15. The system of claim 9, wherein the subarray I/Q samples represent a radar signal containing near-horizon clutter, and wherein the clutter in the gated integrated data samples is representative of the clutter reflecting back from the horizon.

16. A method comprising:
 a) receiving complex I/Q data samples from a ground based digital beamforming radar antenna, the I/Q samples representing a radar signal containing near-horizon clutter from a set of range cells over a target range of interest;
 b) coherently integrating in at least one processor, the received I/Q data samples to increase the ratio CNR of the I/Q data samples;
 c) applying amplitude and phase perturbations to nominal beamsteering weights of the digital beamforming radar antenna and using clutter information contained in the coherently integrated data samples to generate a modified beam steering vector having reduced gain over the solid angle occupied by the near horizon clutter; and
 d) applying said modified beam steering vector to an input of a digital beamformer of said digital beamformer radar antenna receiving complex I/Q data samples representing a radar signal containing near-horizon clutter, to form a spatial sidelobe null in the direction of the received clutter.

17. The method of claim 16, wherein said step b) of coherently integrating the received I/Q data samples to increase the CNR of the I/Q data samples comprises compressing the I/Q samples and zero Hertz Doppler filtering the I/Q samples.

18. The method of claim 16, wherein in said step a) said complex I/Q data samples are received from a plurality of subarrays of said ground based digital beamforming radar antenna.

19. The method of claim 16, wherein said step d) of beamforming by the digital beamformer of the received complex subarray I/Q samples using the adaptively modified complex beam steering vector adaptively cancels sidelobe clutter in the spatial domain from elevated beam positions that do not contain mainlobe clutter.

20. A method of providing to a digital beamformer of a radar a modified complex beam steering vector for use in digital beamforming of complex I/Q data samples representing a radar signal containing near-horizon clutter, the method comprising:
 obtaining subarray I/Q samples from a plurality of subarrays of the digital radar;
 coherently integrating the subarray I/Q samples to increase the CNR;
 adaptively modifying nominal beam steering weights using clutter information contained in the coherently integrated subarray I/Q samples to generate a modified beam steering vector adapted to reduce receive gain over the solid angle occupied by the near horizon clutter;
 beamforming complex I/Q data samples representing a radar signal containing near-horizon clutter and using the modified beam steering vector, to generate a beamformed signal having an elevated mainlobe and a spatial sidelobe null in the direction of the received clutter.

* * * * *